United States Patent
Togahara (10) Patent No.: US 8,204,993 B2
(45) Date of Patent: Jun. 19, 2012

(54) COMPUTER SYSTEM AND INFORMATION PROCESSING METHOD

(75) Inventor: Nobuo Togahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1231 days.

(21) Appl. No.: 11/749,271

(22) Filed: May 16, 2007

(65) Prior Publication Data

US 2007/0213064 A1    Sep. 13, 2007

Related U.S. Application Data

(63) Continuation of application No. PCT/JP2004/017546, filed on Nov. 26, 2004.

(51) Int. Cl.
  *G06F 15/173* (2006.01)
  *H04W 36/00* (2009.01)
  *G06K 5/04* (2006.01)

(52) U.S. Cl. .................... 709/226; 455/436; 714/699

(58) Field of Classification Search .................. 709/226
  See application file for complete search history.

(56) References Cited

U.S. PATENT DOCUMENTS

| | | | | |
|---|---|---|---|---|
| 6,070,191 A * | 5/2000 | Narendran et al. | ........... | 709/226 |
| 6,128,644 A * | 10/2000 | Nozaki | ........... | 709/203 |
| 6,128,657 A | 10/2000 | Okanoya et al. | | |
| 6,330,602 B1 * | 12/2001 | Law et al. | ........... | 709/224 |
| 6,990,667 B2 * | 1/2006 | Ulrich et al. | ........... | 718/105 |
| 7,127,260 B1 * | 10/2006 | Kim et al. | ........... | 455/456.4 |
| 2003/0084140 A1 | 5/2003 | Takeuchi et al. | | |
| 2003/0120724 A1 * | 6/2003 | Kawashimo et al. | ........... | 709/203 |
| 2004/0103194 A1 * | 5/2004 | Islam et al. | ........... | 709/225 |
| 2005/0026615 A1 * | 2/2005 | Kim | ........... | 455/436 |
| 2005/0105490 A1 * | 5/2005 | Lee et al. | ........... | 370/331 |
| 2007/0161374 A1 * | 7/2007 | Kienstra et al. | ........... | 455/436 |

FOREIGN PATENT DOCUMENTS

| | | |
|---|---|---|
| CN | 1512329 | 7/2004 |
| JP | 10-27146 | 1/1998 |
| JP | 2002-163241 | 6/2002 |
| JP | 2004-318417 | 11/2004 |

OTHER PUBLICATIONS

International Search Report of International Application No. PCT/JP2004/017546 (mailed Mar. 8, 2005).
Office Action dated Apr. 11, 2008 and issued in corresponding Chinese Patent Application No. 2004800444806.
European Search Report dated Oct. 15, 2009 in corresponding European Patent Application 048224476.0.
Japanese Office Action mailed Oct. 20, 2009 in corresponding Japanese Patent Application 2006-546501.

* cited by examiner

*Primary Examiner* — Kenny Lin
*Assistant Examiner* — Guang Li
(74) *Attorney, Agent, or Firm* — Fujitsu Patent Center (57) ABSTRACT

A computer system of this invention includes: plural servers; a L7 switch that assigns a processing request from a client terminal to one of the servers; and a session management server that holds and manages handover data that includes handover identification information, which is at least either client terminal identification information or user identification information, and that is data necessary for continuously carrying out the business processing the server carried out. Then, the server to which the processing request is assigned by the L7 switch obtains the pertinent handover data by the handover data identification information included in the processing request to carry out a business processing by using the pertinent handover data and data included in the processing request, and generates handover data for the business processing to transmit the generated handover data to the session management server, and further generates and transmits response data for the client terminal as a processing requesting source.

12 Claims, 7 Drawing Sheets

FIG.1

| SESSION ID | USER ID | STATE | PROCESSING EXECUTION SERVER | TIME | DATA |
|---|---|---|---|---|---|
| AAA001 | Y00001 | 10OK | M1 | 20041106110000 | AHK |
| AAA001 | Y00001 | 11OK | M2 | 20041106110020 | HGF |
| ⋮ | ⋮ | ⋮ | ⋮ | ⋮ | ⋮ |
| | | | | | |

COMPUTER SYSTEM AND INFORMATION PROCESSING METHOD

CROSS-REFERENCE TO RELATED APPLICATIONS

This application is a continuing application, filed under 35 U.S.C. section 111(a), of International Application PCT/JP2004/017546, filed Nov. 26, 2004.

TECHNICAL FIELD OF THE INVENTION

This invention relates to a load distribution and fault countermeasure technique in a computer system.

BACKGROUND OF THE INVENTION

For example, US-2003/0120724-A1 discloses a following technique. That is, in response to a processing request from a client A, a load distribution apparatus B inquires operational states of respective servers C, D and E, selects a first server apparatus C as a server that will execute the processing, based on the results, and by connecting the client with the server apparatus and instructing the start of the processing, the first server apparatus C starts the processing. Here, when data necessary for the processing is found, the server apparatus C outputs a data acquiring request to an application layer server F while it records process information necessary for the restart of the processing into a shared storage means G. When, in the application layer serve F, the creation of the data necessary for the processing is completed and a data reply request is output, a system control apparatus H inquires the operational states of the server apparatuses C, D and E after the data is received, and selects a server apparatus that will restart the processing. As this selection method, a server apparatus that will execute the subsequent processing most efficiently is selected, based on a server apparatus whose load is lightest among the server apparatuses C, D and E, a server apparatus whose number of other processings being currently executed is the smallest, or the like. When the selected server apparatus is the third server apparatus E, the processing is restarted in a server different from the server apparatus C, which initially executed the processing. In this case, the system control apparatus H firstly transmits a connection change request to instruct the change from the connection between the client A and the server apparatus C to the connection with the server apparatus E, to a load distribution apparatus B. The load distribution apparatus B carries out the connection change between the client A and the server apparatus, according to this connection change request. After that, the system control apparatus H transfers the data acquired by the application layer server F to the server apparatus E, and transmits the processing restart instruction. The server apparatus E, which received the transferred data and the processing restart request, does not have the process information necessary for the processing restart, because the server apparatus E is different from the server that carried out the processing before the data is acquired. Then, the server apparatus E refers to the process information, which is necessary for the processing restart and is stored in the shared storage means G, to restart the processing. Thus, by carrying out the load distribution also when the data is acquired and the processing is restarted after the processing is temporarily stopped in order to acquire the data, a further efficient operation of Web layer servers is realized.

However, in the aforementioned technique, because the server apparatus that initially carried out the processing in response to the request from the client A should be selected and the server apparatus that sends a response for the same request should be further selected, it is necessary to carry out a server selection processing twice in order to process one request, and when the loads of the server apparatuses are almost uniform, an additional time for one server selection processing is required. In addition, when the load state is inquired to each server apparatus for each server selection processing, additional loads are required. In the aforementioned technique, when a fault occurs in the server apparatus after the processing is requested to the application layer server, it is possible to complete the processing without affecting the client. However, because the fault occurrence affects the client in a case where the fault occurs after the processing firstly started in the server apparatus or while the data from the application layer server is processed, there is no large effect as the fault countermeasure.

SUMMARY OF THE INVENTION

Therefore, an object of this invention is to provide a new technique for carrying out the load distribution in a computer system while smoothly carrying out the fault countermeasure.

A computer system according to a first aspect of this invention includes: a plurality of business processing units, each having a processor; a load distribution apparatus that assigns a processing request from a client terminal to one of said plurality of business processing units; and a handover data management computer that holds and manages handover data that includes handover identification information, which is at least either client terminal identification information or user identification information, and that is data necessary for continuously carrying out the business processing the business processing unit carried out. Then, the business processing unit to which the processing request is assigned by the load distribution apparatus obtains the pertinent handover data by the handover data identification information included in the processing request to carry out a business processing by using the pertinent handover data and data included in the processing request, and generates handover data for the business processing to transmit the generated handover data to the handover data management computer, and further generates and transmits response data for the client terminal as a processing requesting source without carrying out an assigning processing by the business processing unit again.

By carrying out such a processing, the assigning processing of the business processing unit is kept at a necessary minimum, and also at the fault, it is possible to cope with the fault by the handover data stored and managed by the handover data management computer.

Incidentally, the load distribution apparatus may assign a following processing request from the client terminal to a specific business processing unit when the specific business processing unit, to which assignment is carried out when communication with the client terminal started, is operating, and the load distribution apparatus may assign a processing request to one business processing unit among other business processing unit when a fault occurs in the specific business processing unit. Thus, because there is possibility that the handover data can be acquired without requesting the handover data to the handover data management computer, for example, a high-speed response is realized.

Moreover, the load distribution apparatus may assign a processing request to one business processing unit according to states of the plural business processing units each time when the processing request from the client terminal is received. Thus, the load is distributed more.

Furthermore, session identification information may be used as the handover data identification information, when a fault occurs in a specific business processing unit to which a processing request from a specific client terminal is assigned but a connection between the specific client terminal and the load distribution apparatus is maintained. In such a case, because the processing request with the same session ID is received from the client terminal again, the handover data can be identified by the session ID.

In addition, in a case where the connection between the specific client terminal and the load distribution apparatus is disconnected when a fault occurs in the specific business processing unit to which a processing request from the specific client terminal is assigned, user identification information may be used as the handover data identification information. This is because the user may have to carry out the login again in such a case, and there is a case where the previous session ID cannot be obtained in the business processing unit in such a case.

Furthermore, the business processing unit to which a processing request is assigned by the load distribution apparatus may identify a business processing to be carried out, by using at least either the handover data or data included in the processing request, and may carry out the identified business processing. This is because it is unknown when the fault occurs, and when, for example, the same processing request is received again from the client terminal, it is necessary to judge whether the processing result should be transmitted to the client terminal because the previous processing for the processing request was completed or the business processing should be carried out again because the previous processing for the processing request is not completed.

An information processing method according to a second aspect of this invention includes: assigning a processing request from a client terminal to a specific business unit among plural business processing units by a load distribution apparatus; requesting pertinent handover data for a handover data management computer that holds and manages the handover data that includes handover identification information, which is included in the processing request and is at least either client terminal identification information or user identification information and that is data necessary for continuously carrying out the business processing the business processing unit carried out by the specific business processing unit to which the processing request was assigned, by using the handover data identification information; identifying and replying the handover data in response to the request of the handover data from the specific business processing unit by the handover data management computer; receiving the handover data relating to the request from the handover data management computer, carrying out a business processing by using the received handover data and data included in the processing request, and generating handover data for the business processing and transmitting the generated handover data to the handover data management computer by the specific business processing unit; receiving and storing the handover data from the specific business processing unit by the handover data management computer; and generating response data for a client terminal as a processing requesting source by the specific business management unit without carrying out the assigning processing of the business processing unit again.

Thus, while the response time is shortened in the entire computer system, the measures can be smoothly carried out when any fault occurs.

Furthermore, an information processing method executed by a business processing unit including a processor, according to a third aspect of this invention, includes: receiving, from a load distribution apparatus, a processing request from a client terminal; acquiring handover data that includes handover identification information, which is included in the processing request and is at least either client terminal identification information or user identification information, and that is data necessary for continuously carrying out the business processing carried out in the past for a user of the client terminal by using the handover data identification information; carrying out the business processing by using the acquired handover data and data included in the processing request to generate the handover data for the business processing, and transmitting the generated handover data to a handover management computer that stores and manages the handover data; and generating and transmitting response data for the client terminal as a processing requesting source without carrying out an assigning processing of the business processing unit again.

In addition, in the aforementioned acquiring, when the handover data cannot be acquired from a storage device of the business processing unit, the handover data may be requested to the handover data management computer. For example, when the processing requests are assigned so as to subsequently carry out the business processing in the same business processing unit as much as possible, the handover data may be held in its own storage device. In such a case, this is because there may be no need to request the handover data to the handover data management computer.

Incidentally, it is possible to create a program for causing a computer to execute the aforementioned information processing method according to the present invention. The program is stored into a storage medium or a storage device such as a flexible disk, a CD-ROM, a magneto-optical disk, a semiconductor memory, or a hard disk. In addition, the program may be distributed as digital signals over a network in some cases. Incidentally, data under processing is temporarily stored in the storage device such as a computer memory.

DETAILED DESCRIPTION OF THE PREFERRED EMBODIMENTS

Figure 1:
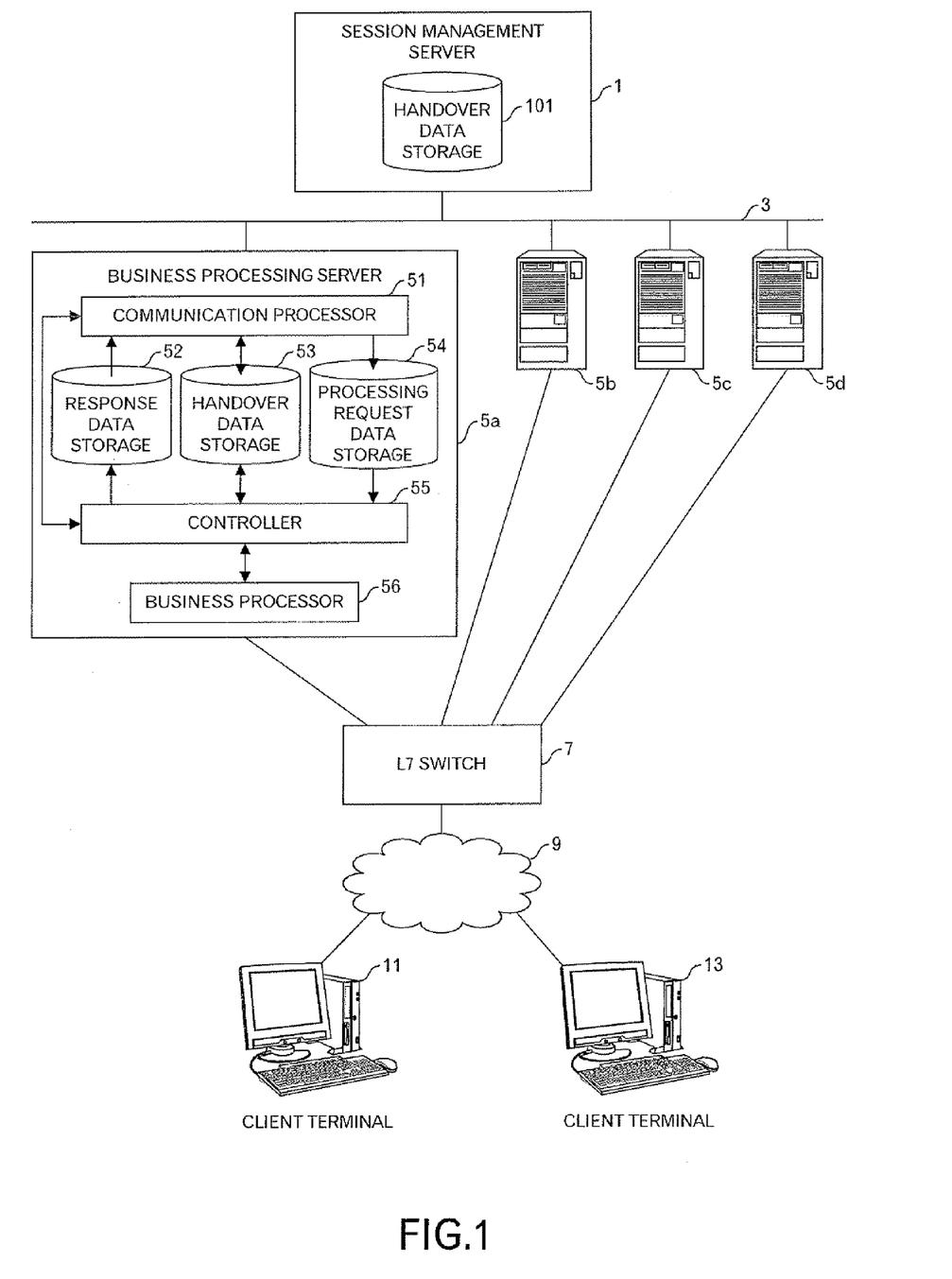
FIG. 1 is a functional block diagram according to one embodiment of this invention.

FIG. 1 shows a system configuration diagram according to one embodiment of this invention. For example, a network 9 such as the Internet is connected to plural client terminals 11 and 13 that are personal computers, for example, and have a Web browser function, and a L7 switch 7. The L7 switch 7 is connected with plural business processing servers 5a to 5d having a Web server function, for example. This business processing servers 5a to 5d may be servers such as blade servers, may be respective processor units in a shared memory type parallel computer or may be other processing units including a processor. In addition, the business processing servers 5a to 5d are connected with a session management server 1 via a Local Area Network (LAN) 3.

Figure 2:
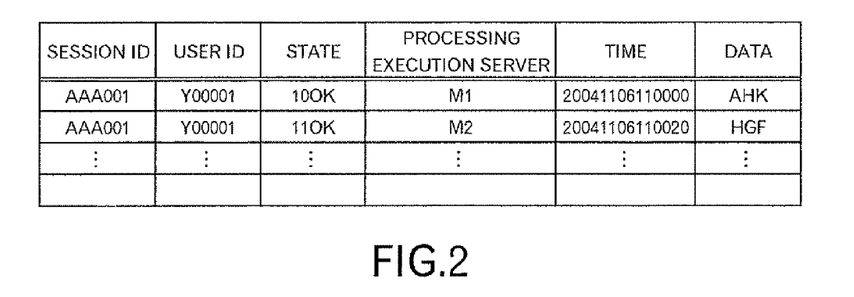
FIG. 2 is a diagram showing an example of data stored in a handover data storage.

The session management server 1 has a handover data storage 101. For example, data as shown in FIG. 2 is stored in the handover data storage 101. That is, the following data is registered: a session ID to identify the session with the client terminal 11 or 13, a user ID of a user operating the client terminal 11 or 13, data representing a state of the business processing carried out by the business processing servers 5a to 5d, an ID of a server that carried out the business processing, and data necessary for continuously carrying out the business processing executed by the business processing server 5a to 5d this time. In this embodiment, it is assumed that the same session ID is used from the login to the log-off. However, it is possible to switch the session ID when the specific business is apparently completed. In addition, the data representing the state is composed of a combination of a code of a screen displayed on the client terminal 11 or 13 or a code to identify a step in the specific business processing and a processing state (normal end, abnormal end or the like). The data necessary for continuously carrying out the business processing includes data of the customer and the like, which is input on a customer registration screen and transmitted to the business processing server when the customer registration, for example, is requested. This data of the customer and the like is data necessary for continuously carrying out the business processing because it is used when a confirmation screen of the customer registration, for example, is generated and transmitted. In addition, for example, when a confirmation button is clicked on the confirmation screen of the customer registration, and the real registration of the customer information is requested, the data necessary for continuously carrying out the business processing is a combination of the customer code and a code representing the customer registration completion or the like. This is because it is data necessary to notify the customer registration completion.

Incidentally, as for the handover data (each record) stored in the handover data storage 101, when it is apparent that a series of business processings are completed, all handover data relating to the business processings are deleted or when a predetermined period has passed since the processing time, the pertinent handover data is deleted.

Each of the business processing servers 5a to 5d includes a communication processor 51 that communicates with the L7 switch 7 and with the LAN 3; a response data storage 52 that stores response data to the client terminal 11 or 13; a handover data storage 53; a processing request data storage 54 that stores the business processing request and the like from the client terminal 11 or 13; a controller 55; and a business processor 56 to carry out various business processing.

The communication processor 51 stores the business processing request and the like received from the L7 switch 7 into the processing request data storage 54. The controller 55 refers to the business processing request and the like stored in the processing request data storage 54 to cause the communication processor 51 to transmit an acquiring request of the handover data to the session management server 1. Incidentally, on this occasion, it may refer to the handover data storage 53. When receiving the handover data from the session management server 1, the communication processor 51 stores the received handover data into the handover data storage 53. The controller identifies the business processing to be carried out based on the handover data and the business processing request and the like, and causes the business processor 56 to carry out the business processing. The business processor 56 carries out a processing according to an instruction, and outputs the processing result to the controller 55. The controller generates the handover data based on the processing result and the like, and outputs the handover data to the handover data storage 53, and causes the communication processor 51 to transmit the handover data to the session management server 1. Furthermore, the controller 55 automatically constructs the response data and outputs the response data to the response data storage 52, and causes the communication processor 51 to transmit the response data to the client terminal 11 or 13 as a requesting source via the L7 switch 7.

The L7 switch 7 has a load balancer function, and carries out the load distribution by using various load distribution algorithms (round robin or static weighting, minimum number of connections, minimum number of clients, minimum data communication volume, minimum response time, minimum CPU load ratio, minimum memory use ratio, minimum disk load ratio or the like). Incidentally, such a load distribution function is well-known, and the L7 switch 7 includes a function for carrying out a state check for the business processing servers 5a to 5d at predetermined interval or at an arbitrary timing. The state check includes a check of the load state of each business processing server in addition to the check of whether or not it is normal or abnormal. In addition, the L7 switch 7 manages a correspondence table of the IP address or the like of the client terminal and the IP address or the like of the business processing server to which the business processing is assigned according to the load distribution algorithm.

Next, a processing content of the computer system shown in FIG. 1 will be explained by using FIGS. 3 to 8. Incidentally, FIGS. 3 to 6 will be explained assuming the login has already been completed. First, it is assumed that the client terminal 11 displays, for example, a menu screen or the like, and the start of the specific business processing is instruct by the user. Then, the client terminal 11 transmits a specific business start request A to the L7 switch 7 in response to the instruction (step S1) Incidentally, the business start request A includes the user ID by using a cookie or in a form of embedding into the Uniform Resource Locator (URL). The L7 switch 7 receives the specific business start request A from the client terminal 11 (step S3), and identifies a business processing server (M1 (one of the business processor servers 5a to 5d)) according to a predetermined rule (step S5). The predetermined rule may be a rule in which the selection is simply carried out according to the load states, the presence or absence of the fault in the business processing servers 5a to 5d and the like, and may be a rule in which the business processing request and the like from the client terminal is assigned to the same business processing server as much as possible, and when the fault occurs in the business processing server, the selection is carried out among other business processing servers according to the load states and the like. Incidentally, because the response data is replied, the correspondence relation of the IP address of the client terminal 11 and the IP address of the specified business processing server (M1) or the like is stored in any case. Then, the L7 switch 7 transmits the specific business start request A to the business processing server (M1) (step S7).

Figure 3:
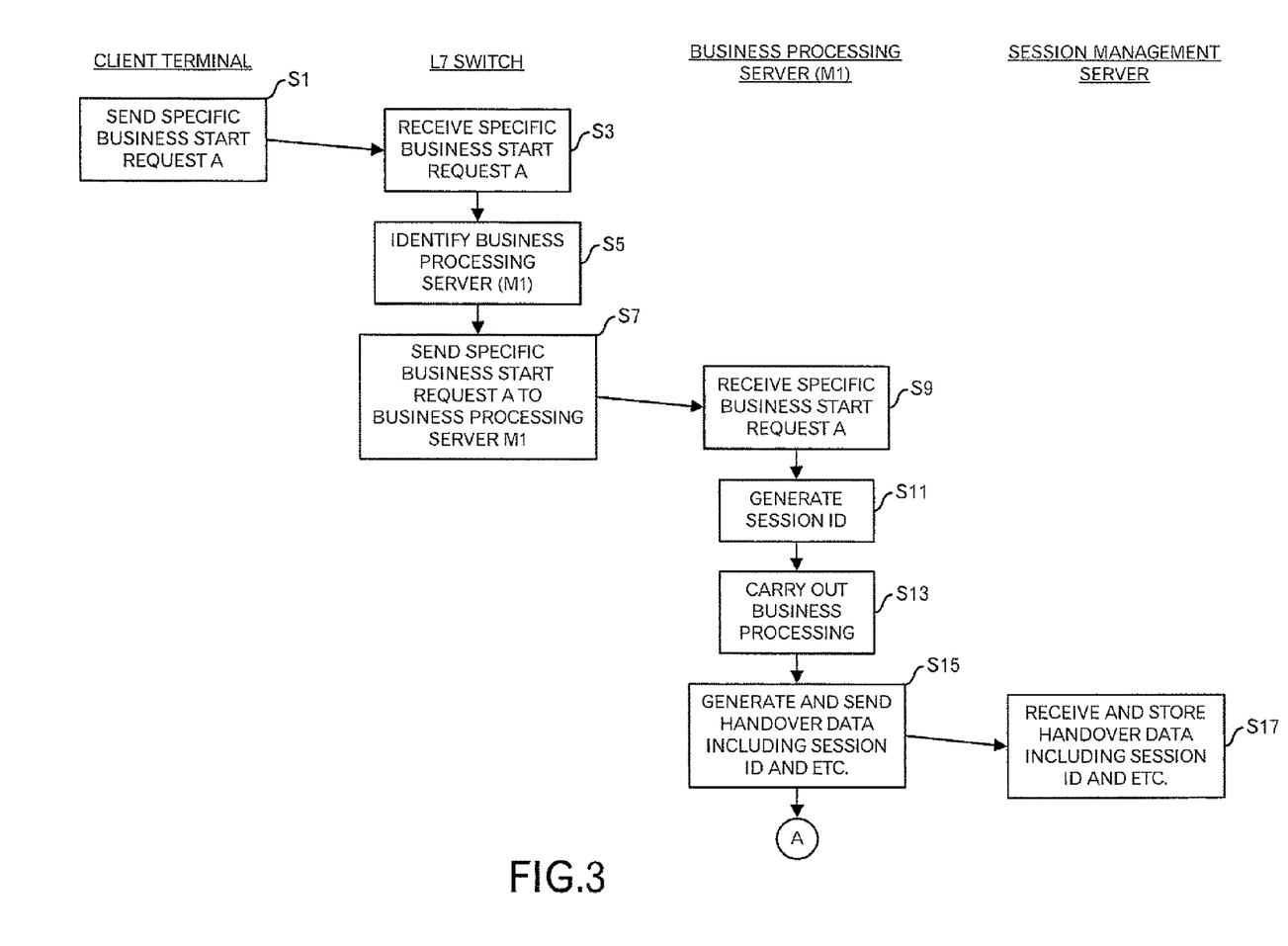
FIG. 3 is a diagram showing a first processing flow according to this embodiment.

In response to this, the communication processor 51 of the business processing server (M1) receives the specific business start request A from the L7 switch 7, and stores the request into the processing request data storage 54 (step S9). Then, the controller 55 of the business processing server (M1) newly generates a session ID because of the start of the business (step S11), and causes the business processor 56 to carry out the business processing at the start of the business (step S13). Incidentally, after or before the step S1, a processing to acquire the handover data from the session management server 1 by using the user ID as a key may be carried out. However, when the business processing start can be explicitly grasped like this case, the acquisition of the handover data can be omitted. The controller 55 receives the processing result when the business processing is completed by the business processor 56, generates the handover data including the session ID and the like, and stores the handover data into the handover data storage 53 and causes the communication processor 51 to transmit the handover data to the session management server 1 (step S15). As for the user ID, the user ID at the login is delivered by using the cookie or other methods. The session management server 1 receives the handover data including the session ID and the like from the business processing server (M1) and stores the handover data into the handover data storage 101 (step S17). The stored handover data is data as shown in FIG. 2. When the write operation to the handover data storage 101 has been completed, the session management server 1 transmits the processing completion to the business processing server (M1). Then, the processing shifts to a processing shown in FIG. 4 via a terminal A. Incidentally, when the specific business processing is registration of the customer information, the handover data includes the session ID, the user ID and state information such as the screen ID or the like as main data.

Figure 4:
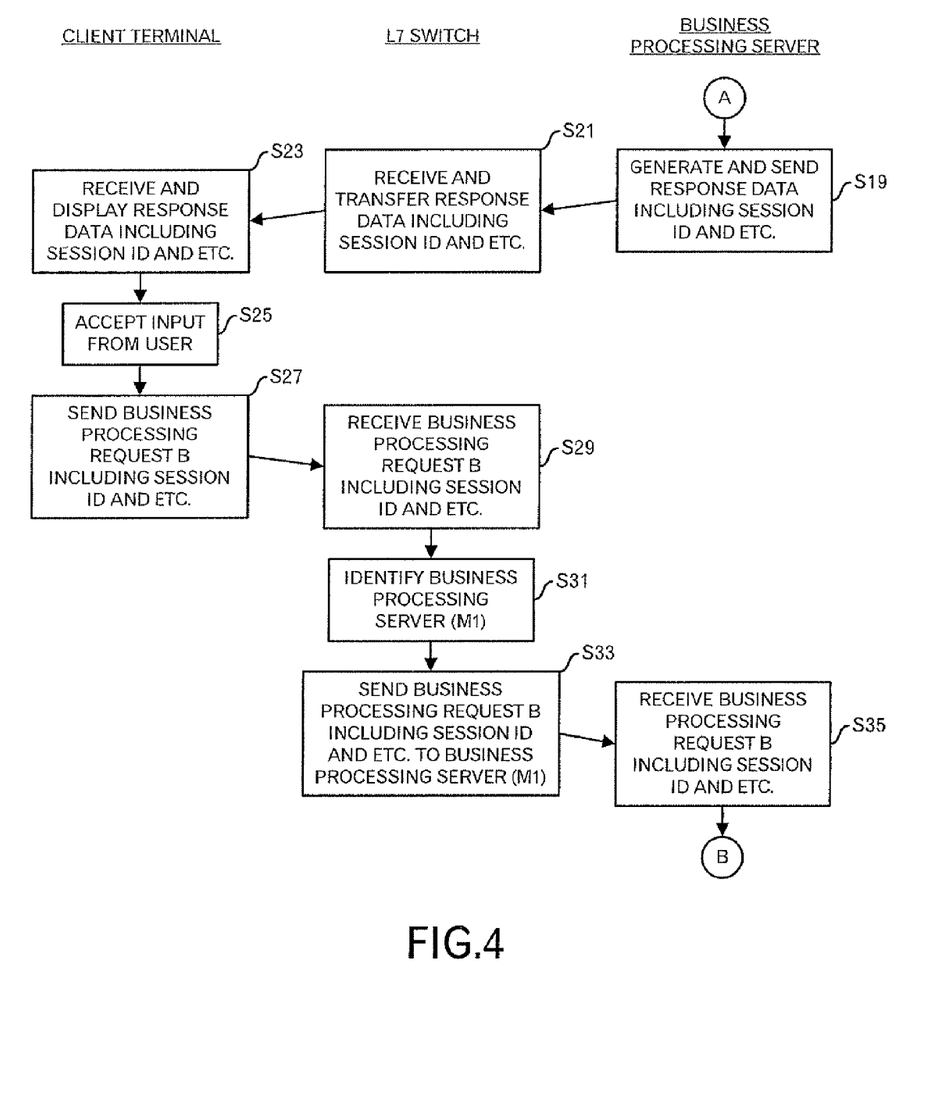
FIG. 4 is a diagram showing a second processing flow according to this embodiment.

Next, the controller 55 of the business processing server (M1) generates response data including the session ID and the like, and causes the communication processor 51 to transmit the response data to the L7 switch 7 (FIG. 4: step S19). The session ID and the user ID are held in, for example, the cookie, and are transmitted with Web page data for the registration screen of the customer information in the above example. Incidentally, they may be embedded into not only the cookie but also URL. The L7 switch 7 receives the response data including the session ID and the like from the business processing server (M1), and transfers the response data to the client terminal 11 of the requesting source (step S21). The client terminal 11 receives the response data including the session ID and the like from the L7 switch 7, and displays the response data on the display device (step S23). Incidentally, when the session key and the like are transmitted by using the cookie, the cookie is stored into a storage device. By this step, because the registration screen of the customer information, for example, is displayed, the user inputs the customer information. The client terminal 11 accepts the input by the user (step S25), and transmits a business processing request B including the session ID, the input data and the like in response to the click of a send button, for example (step S27).

The L7 switch 7 receives the business processing request B including the session ID, the input data and the like from the client terminal 11 (step S29), and identifies the business processing server according to the predetermined rule similar to the aforementioned case (step S31). Here, it is assumed that the business processing server (M1) is identified. Then, the L7 switch 7 transmits the business processing request B including the session ID, the input data and the like to the identified business processing server (M1) (step S33). The communication processor 51 of the business processing processor (M1) receives the business processing request B including the session ID, the input data and the like, and stores the business processing request into the processing request data storage 54 (step S35). The processing shifts to a processing of FIG. 5 via a terminal B.

Figure 5:
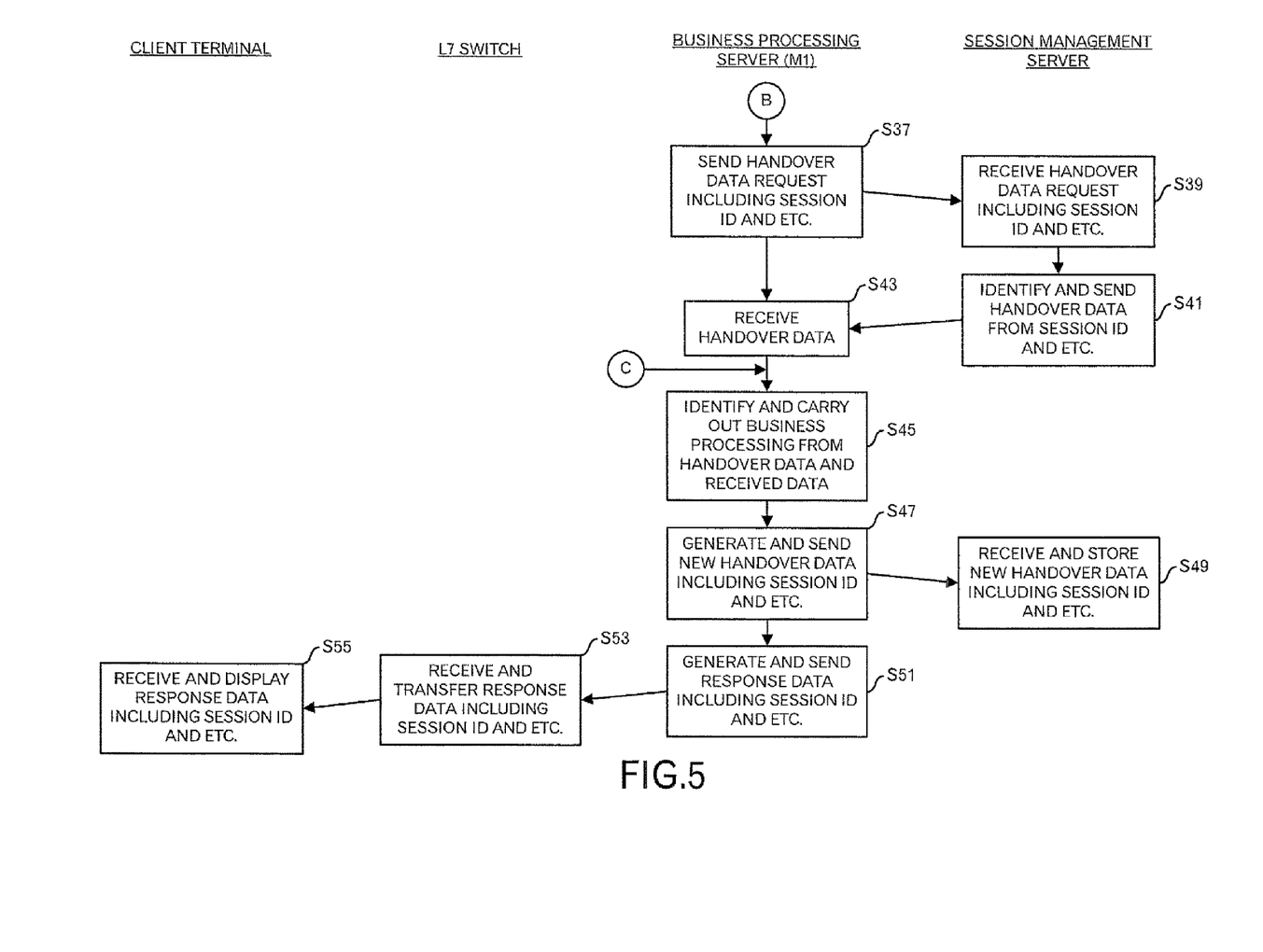
FIG. 5 is a diagram showing a third processing flow according to this embodiment.

The controller 55 of the business processing server (M1) reads out the session ID and the like included in the business processing request stored in the processing request data storage 54, generates a handover data request including the session ID and the like to cause the communication processor 51 to transmit the handover data request to the session management server 1 (FIG. 5: step S37). Incidentally, the handover data request may be transmitted to the session management server 1 only when the handover data storage 53 is referenced to confirm whether or not the immediately previous handover data is stored, and it is judged that the immediately previous handover data is not stored. Thus, the response to the client terminal can be speedily transmitted. The session management server 1 receives the handover data request including the session ID and the like from the business processing server (M1) (step S39), searches the handover data storage 101 by using the session ID and the like, identifies the pertinent immediately previous handover data, and transmits the immediately previous handover data to the business processing server (M1) of the requesting source (step S41).

When the communication processor 51 of the business processing server (M1) receives the handover data from the session management server 1, the communication processor 51 stores the handover data into the handover data storage 53. Then, the controller 55 of the business processing server (M1) identifies the business processing to be carried out based on the immediately previous handover data stored in the handover data storage 53 and the data of the business processing request B stored in the processing request data storage 54, and causes the business processor 56 to execute the business processing (step S45). For example, when the handover data includes the screen ID of the registration screen of the customer information and the customer information is included in the data of the business processing request, it can be judged that the customer information registration confirmation should be carried out by proceeding to the next processing stage. Therefore, as the business processing to be carried out, the generation of the Web page data for the screen of the customer information registration confirmation, which includes the received customer information, is carried out.

Then, the controller 55 of the business processing server (M1) generates new handover data including the session ID and the like, stores the new handover data into the handover data storage 53 and causes the communication processor 51 to transmit the new handover data including the session ID and the like to the session management server 1 (step S47). For example, the new handover data includes the received customer information. When the session management server 1 receives the handover data including the session ID and the like from the business processing server (M1), the session ID server 1 stores the handover data into the handover data storage 101 (step S49). Then, when the write of the handover data into the handover data storage 101 has been complete, the session management server 1 transmits the write completion notice to the business processing server (M1). When the communication processor 51 of the business processing server (M1) receives the write completion notice from the session management server 1, the controller 55 of the business processing server (M1) generates response data including the session ID and the like for the client terminal 11, and stores the response data into the response data storage 52, and causes the communication processor 51 to transmit the response data to the L7 switch 7 (step S51). As described above, the session ID and the like are transmitted by using the cookie or other means.

When the L7 switch 7 receives the response data including the session ID and the like from the business processing server (M1), the L7 switch 7 transfers the response data to the client terminal 11 of the requesting source (step S53). The client terminal 11 receives the response data including the session ID and the like from the L7 switch 7, and displays the response data on the display device (step S55). Incidentally, when the session ID and the like are sent by using the cookie, the session ID and the like are stored in the storage device.

Thus, by storing the handover data into the handover data storage 101 in the session management server 1, it becomes possible to cope with the fault, and the load balance between the business processing servers is further improved. That is, it is expected that the response time to the client terminal is shortened.

Next, a case where a fault occurred in the business processing server (M1) will be explained. Incidentally, it is assumed that the fault occurs at the step S37 or after the step S37 in the business processing server (M1). In addition, the processing is changed somewhat depending on the function of the L7 switch 7, when the fault occurs. That is, there are two cases where the connection between the client terminal 11 and the L7 switch 7 is held, and where the connection is not held, even when the fault occurs in the business processing server (M1) that is an assignment destination of the processing request. Therefore, these cases will be separately explained.

First, the case where the connection between the client terminal 11 and the L7 switch 7 is held will be explained by using FIG. 6. In such a case, because any response is not replied, although the user waited for some time after clicking, for example, a send button, the user clicks, for example, a stop button on the Web browser and further clicks the send button again. Then, the client terminal 11 accepts the instruction from the user, and resends the business processing request B including the session ID, the input data and the like to the L7 switch 7 (step S61).

The L7 switch 7 receives the business processing request B including the session ID, the input data and the like from the client terminal 11 (step S63), and identifies the business processing server according to the predetermined rule similarly to the aforementioned rule (step S65). However, because the fault occurred in the business processing server (M1), the business processing request B cannot be assigned to the business processing server (M1). Therefore, here, the business processing server (M2 (one business processing server other than the business processing server in which the fault occurred, among the business processing servers 5*a* to 5*d*)) is identified. Then, the L7 switch 7 transmits the business processing request B including the session ID, the input data and the like to the identified business processing server (M2) (step S67). The communication processor 51 of the business processing server (M2) receives the business processing request B including the session ID, the input data and the likes and stores the business processing request B into the processing request data storage 54 (step S69).

The controller 55 of the business processing server (M2) reads out the session ID and the like included in the business processing request stored in the processing request data storage 54, and generates the handover data request including the session ID and the like to cause the communication processor 51 to transmit the request to the session management server 1 (step S71). Incidentally, the handover data request may be transmitted to the session management server 1 only when the handover data storage 53 is referenced to confirm whether or not the immediately previous handover data is stored and it is judged that the immediately previous handover data is not stored. However, because the immediately previous handover data is not stored in the handover data storage 53 in this case, the step S71 is executed as it is. The session management server 1 receives the handover data request including the session TD and the like from the business processing server (M2) (step S73), searches the handover data storage 101 by using session ID and the like to identify the pertinent immediately previous handover data, and transmits the handover data to the business processing server (M2) of the requesting source (step S75).

When the communication processor 51 of the business processing server (M2) receives the handover data from the session management server 1 (step S77), the communication processor 51 stores the handover data into the handover data storage 53. Then, the processing shifts to step S45 of FIG. 5 via a terminal C.

Incidentally, at the step S45, the processing is changed depending on the timing when the fault occurred in the business processing server (M1). For instance, when the business processing server (M1) stopped without executing the necessary business processing, it is necessary to execute the necessary business processing by using the handover data and the input data included in the business processing request B. Therefore, the processing similar to the processing when the business processing request B is firstly received is carried out. On the other hand, when the business processing server (M1) carried out the necessary business processing, and stopped after the handover data is generated and transmitted to the session management server 1, the response data is generated using the data included in the handover data without processing by using the business processing request B because the handover data includes data representing that the business processing is completed.

For example, when data representing the completion of the customer information registration is included in the handover data, Web page data to notify the user of the completion of the customer information registration is generated without carrying out the customer information registration again even when the business processing request B includes the customer registration instruction. On the other hand, when the customer information for the registration confirmation of the customer information is included in the handover data, and the business processing request B includes the customer registration instruction, the customer information registration processing is carried out as the necessary business processing because the customer information registration is not carried out.

However, in a case where the necessary business processing is substantially equivalent to the generation of the response data such as the generation of Web page data for the confirmation screen, for example, the processing similar to the processing in a case where the business processing request B is firstly received is carried out. For example, when the customer information for the registration confirmation of the customer information is included in the handover data, and the customer information is also included in the business processing request B, the Web page data for the registration confirmation of the customer information is generated similarly to a case where the business processing request B is firstly received.

Incidentally, when the business processing server (M1) stopped during the generation of the handover data after the execution of the business processing or before the registration of the handover to the session management server 1, the same business processing is carried out. However, for example, by additionally carrying out a confirmation processing to check double registration in the business processing, and carrying out a post-processing to cause the user to confirm in a case where the double registration is detected, the aforementioned case can be coped with, properly.

Figure 7:
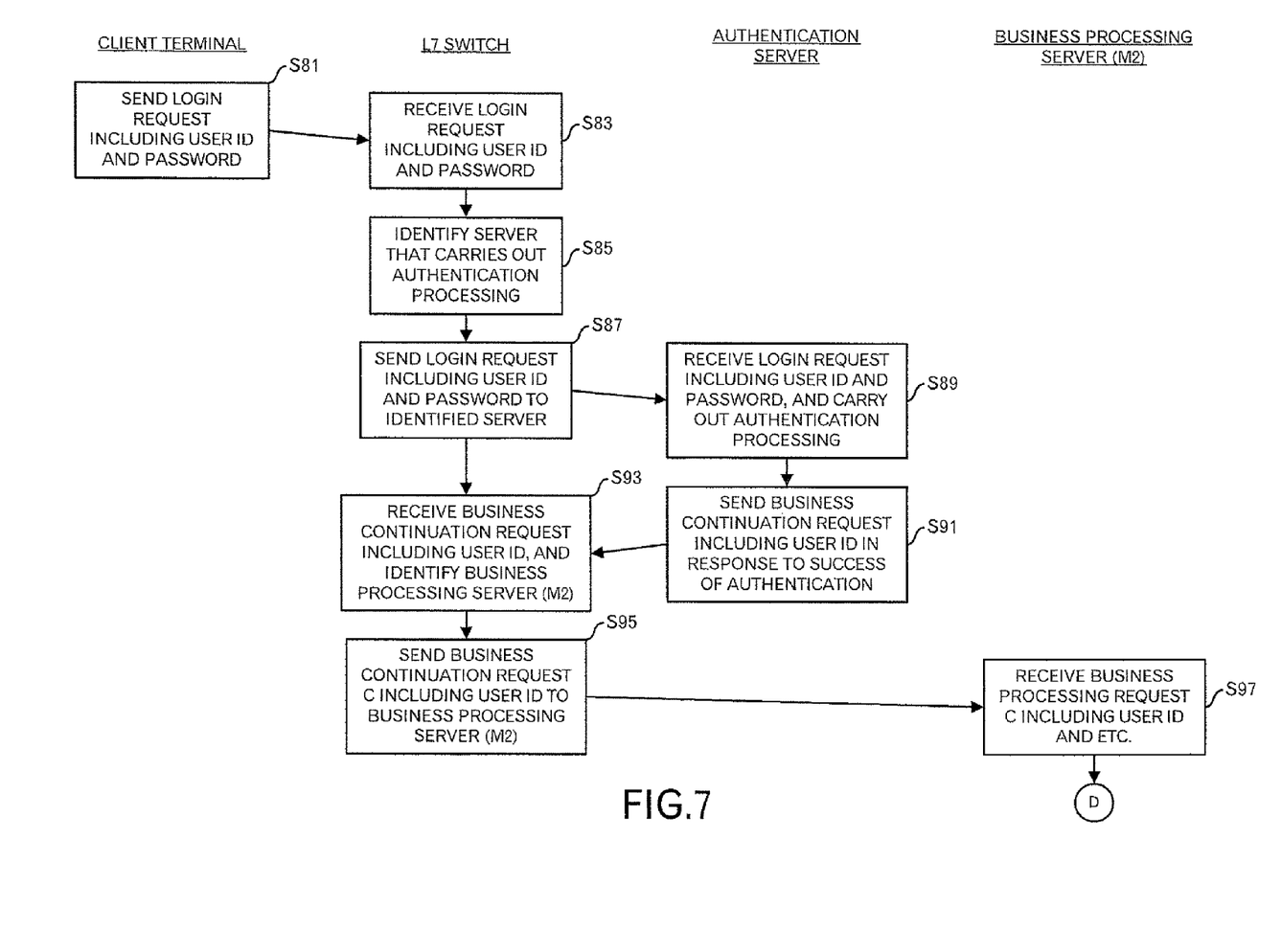
FIG. 7 is a diagram showing a fifth processing flow according to this embodiment.
Figure 8:
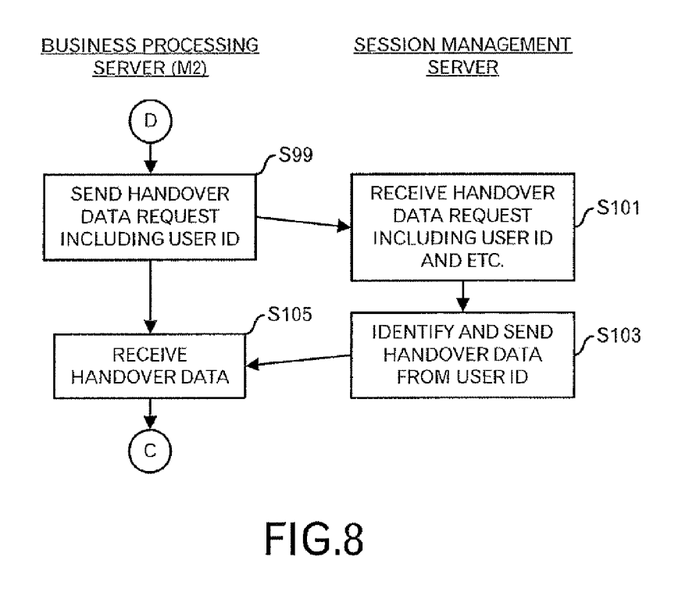
FIG. 8 is a diagram showing a sixth processing flow according to this embodiment.

Next, a case where the connection between the L7 switch 7 and the client terminal 11 is not held will be explained by suing FIGS. 7 and 8. In such a case, because any response is not returned although the user waited for some time after clicking, for example, the send button, the user clicks the stop button on the Web browser and further clicks the send button again. However, because the connection is not held, the client terminal 11 receives Web page data to request the re-login as an error, and displays the Web page on the display device. Then, the user inputs the user ID and password into input columns. The client terminal accepts the input of the user ID and password from the user, and transmits the login request including the user ID and password to the L7 switch 7 (step S81). L7 switch 7 receives the login request including the user ID and password (step S83), and identifies a server carrying out the authentication processing (step S85). As for the server carrying out the authentication processing, there is a case where a specific business processing server has already been identified for the authentication processing among, for example, the business processing servers 5a to 5d although FIG. 1 does not show, and there is also a case where a business processing server is selected based on the load state or the like among any business processing servers that can carry out the authentication processing. The L7 switch 7 transmits a login request including the user ID and password to the identified authentication server (step S87). The authentication server receives the login request including the user ID and password, and carries out the authentication processing (step S89). When the authentication is failed, the authentication server transmits Web page data to prompt inputs of the user ID and password again to the client terminal 11 via the L7 switch 7. On the other hand, when the authentication is succeeded, the authentication server transmits a business continuation request including the user ID to the L7 switch 7 (step S91). When the L7 switch 7 receives the business continuation request including the user ID from the authentication server (step S91). Here, it is assumed that the business processing server (M2) is selected. Then, the L7 switch 7 transmits the business continuation request C including the user ID to the business processing server (M2) (step S95). The communication processor 51 of the business processing server (M2) receives the business continuation request C including the user ID from the L7 switch 7 (step S97), and stores the request into the processing request data storage 54. The processing shifts to a processing in FIG. 8 via a terminal D.

The controller 55 of the business processing server (M2) reads out the user ID included in the business continuation request C stored in the processing request data storage 54 to generate a handover data request including the user ID, and causes the communication processor 51 to transmit the handover data request to the session management server 1 (step S99). Incidentally, the handover data request may be transmitted to the session management server 1 only when the handover data storage 53 is referenced to confirm whether or not the immediately previous handover data is stored, and it is judged that the immediately previous handover data is not stored. However, because the immediately previous handover data is not stored in the handover data storage 53 in this case, the step S99 is executed as it is. Furthermore, because any session ID is not included in the business continuation request, the session ID is issued. Then, the session management server 1 receives the handover data request including the user ID from the business processing server (M2) (step S101), searches the handover data storage 101 by using the user ID to identify the pertinent immediately previous handover data, and transmits the handover data to the business processing server (M2) of the requesting source (step S103). Incidentally, although the valid handover data is stored in the handover data storage 101 because it is assumed that the re-login is carried out after the fault occurred, there is a case where the handover data does not exist in the processing at the normal login.

When the communication processor 51 of the business processing server (M2) receives the handover data from the session management server 1 (step S105), the communication processor 51 stores the handover data into the handover data storage 53. Then, the processing shifts to the step S45 in FIG. 5 via the terminal C.

Figure 6:
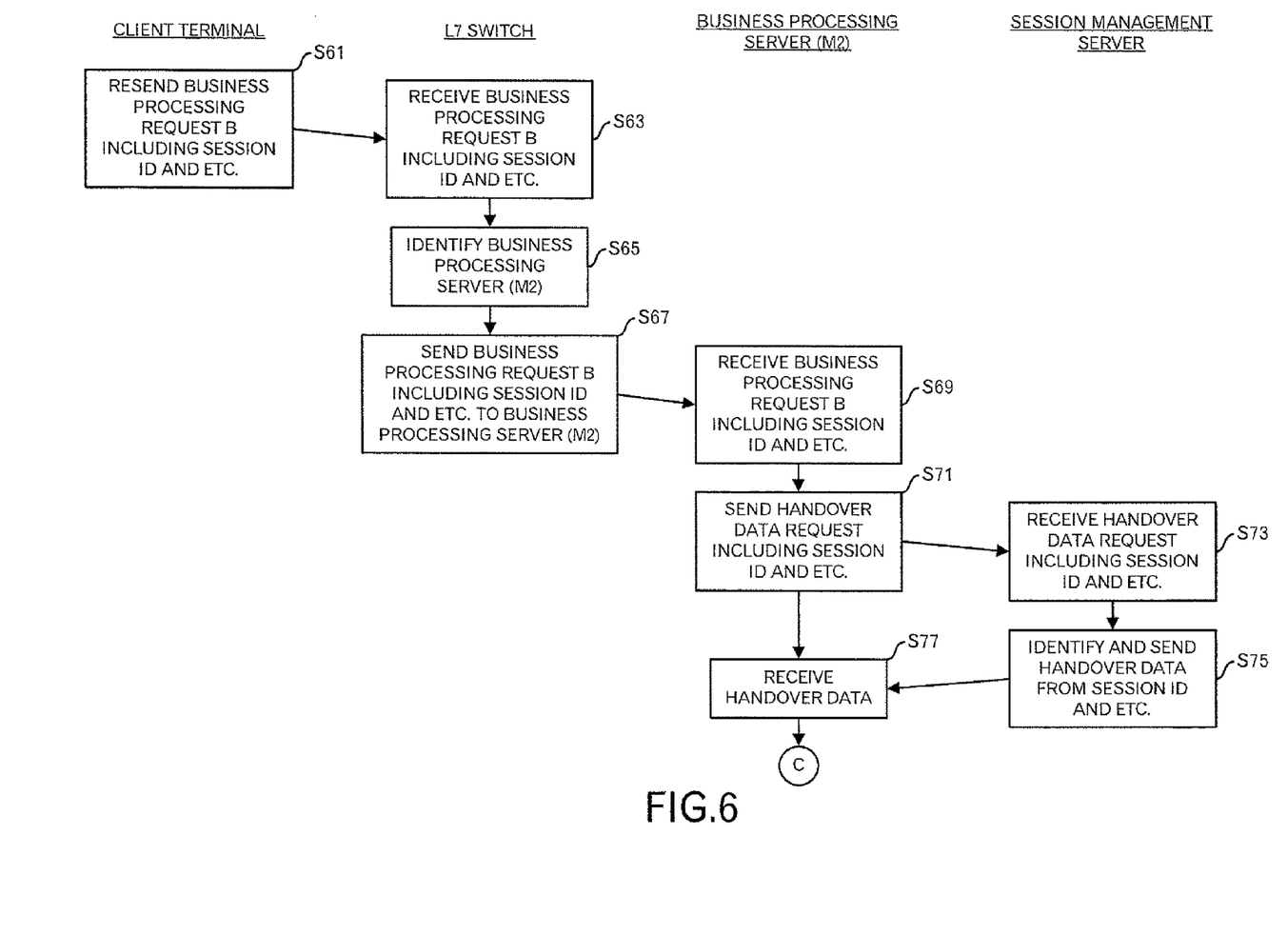
FIG. 6 is a diagram showing a fourth processing flow according to this embodiment.

Incidentally, at the step S45, the processing described in association with FIG. 6 is carried out when the handover data can be received and the content of the handover data represents the business processing is on the way. However, when the normal login is carried out, there is a case where the handover data does not exit. In addition, there is a case where the handover data is data representing the completion of the business processing. In such a case, the controller 55 of the business processing server (M2) causes the business processor 56 to carry out the generation of the menu page data, for example, as the first processing of the business processing. Therefore, the business processing can normally be started in response to the instruction of the user.

By carrying out such a processing, it is possible to correct the load unbalance among the business processing servers, and it is expected that the response time is shortened, and it is possible to reduce the workload that the customer repeats the job from the initial step even when the fault occurs. Incidentally, because the L7 switch 7 does not carry out the assigning processing twice in order to reply one response to the client terminal, the load for the assigning processing is reduced. When the inquiry of the state to the respective business processing servers is carried out for each assigning processing, the load is reduced according to this embodiment.

Although the embodiment of this invention is explained, this invention is not limited to this embodiment. For example, although an example of one-layer client server system is shown in FIG. 1, the aforementioned processing can be carried out even in a case of three layers.

Furthermore, the functional blocks in the business processing server 5a shown in FIG. 1 may not always correspond to actual program modules. In addition, the network 9 is not only the Internet, but also the Intranet in the company.

Furthermore, the aforementioned processing flows are mere examples, and the modification of the processing flows can be adopted as far as the processing results are identical when the order of the steps is exchanged. The step S93 and subsequent steps may be carried out when the Web page data for the menu screen is generated one to transmit the Web page data to the client terminal 11 after the authentication server successfully carries out the authentication in FIG. 7, and for example, the user instructs the business continuation.

Figure 9:
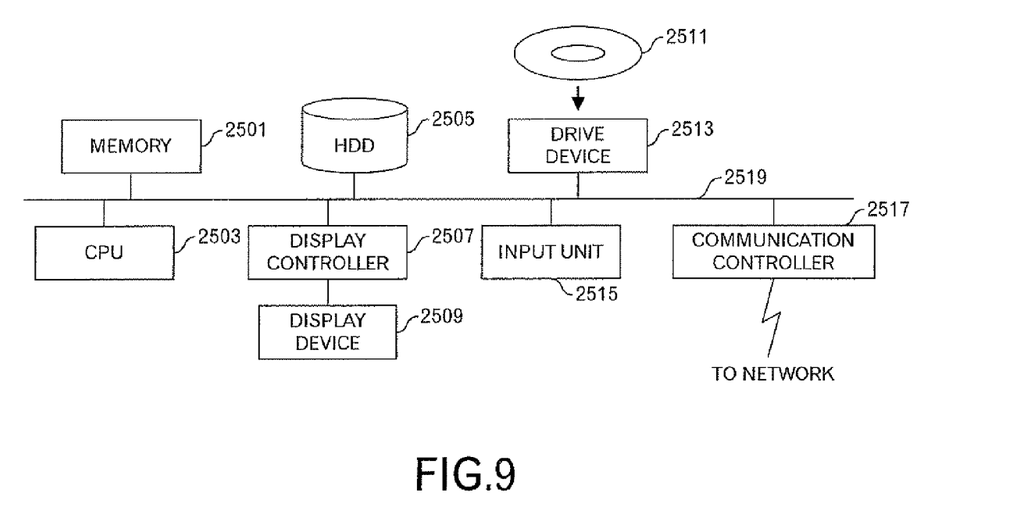
FIG. 9 is a functional block diagram of a computer.

Incidentally, the aforementioned business processing servers 5a to 5d, the session management server 1 and the client terminals 11 and 13 are computer devices as shown in FIG. 9. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

What is claimed is:

1. A computer system, comprising:
   a plurality of processing units, each having a processor;
   a load distribution apparatus that assigns a processing request from a client terminal to one of said plurality of processing units; and
   a handover data management computer that holds and manages handover data that includes handover data identification information including user identification information, wherein said handover data is used to continuously carry out a processing of said processing request and said user identification information includes a user identifier received from said client terminal when a client of said client terminal logged into said computer system, and
   wherein, when a connection between said client terminal and said load distribution apparatus is disconnected when a fault occurs in said one of said plurality of processing units to which a first processing request was assigned, another one of said plurality of processing units to which a second processing request is assigned by said load distribution apparatus obtains, by using user identifier included in said user identification information in said second processing request, said handover data to carry out said processing of said first processing request, and generates handover data for said second processing request carried out by said another one of said processing units to transmit generated handover data to said handover data management computer, and further generates and transmits response data for said client terminal.

2. The computer system as set forth in claim 1, wherein said load distribution apparatus assigns a following processing request from said client terminal to said one of said plurality of processing units, when said one of said plurality of processing units, to which assignment was carried out when communication with said client terminal started, is operating.

3. The computer system as set forth in claim 1, wherein said load distribution apparatus assigns a processing request to one of said plurality of processing units according to states of said plurality of processing units, each time when said processing request from said client terminal is received.

4. The computer system as set forth in claim 1, wherein a processing unit to which a processing request was assigned by said load distribution apparatus identifies a processing to be carried out, by using at least either said handover data or data included in said processing request, and carries out the identified processing.

5. The computer system as set forth in claim 1, wherein said plurality of processing units store the generated handover data in a memory device of said plurality of processing units, and, when said second processing request is assigned to said another one of said plurality of processing units by said load distribution apparatus, said another one of said plurality of processing units acquires handover data including the same user data identification information as user data identification information included in the second processing request from said memory device or from said handover data management computer if said memory device does not store said handover data.

6. An information processing method, comprising:
   assigning a processing request from a client terminal to one of a plurality of processing units by a load distribution apparatus after a connection between said client terminal and said load distribution apparatus is disconnected when a fault occurs in another one of said plurality of processing units to which a previous processing request was assigned;
   requesting handover data for a handover data management computer that holds and manages handover data that includes handover data identification information, by said one of said processing units, wherein said handover data identification information includes user identification information, said handover data is used to continuously carry out a processing of said previous processing request, and said user identification information includes a user identifier received from said client terminal when a client of said client terminal logged-in;
   in response to a request including user identification information including a user identifier from said one of said processing units, identifying and replying said handover data including said user identification information including said user identifier included in said request, by said handover data management computer;
   receiving said handover data from said handover data management computer, by said one of said processing units;
   carrying out said processing, by said one of said processing units, by using the received handover data;
   generating handover data for said processing that said one of said processing units carried out;
   transmitting the generated handover data to said handover data management computer, by said one of said processing units;
   receiving and storing said handover data from said one of said processing units by said handover data management computer; and
   generating response data for said client terminal by said one of said processing units.

7. An information processing method executed by a first processing unit including a processor, comprising:
   receiving, from a load distribution apparatus, a processing request from a client terminal after a connection between said client terminal and said load distribution apparatus is disconnected when a fault occurs in one of processing units to which a previous processing request from said client terminal was assigned;
   acquiring, by using user identification information including a user identifier included in said processing request, handover data that includes handover data identification information, wherein said handover data identification information includes user identification information including a user identifier received from said client terminal when a client of said client terminal logged-in, and said handover data is used to continuously carry out a processing carried out by said one of said processing units;

carrying out said processing of said processing request by using the acquired handover data to generate handover data;

transmitting the generated handover data to a handover management computer that stores and manages said handover data; and generating and transmitting response data for said client terminal.

8. The information processing method as set forth in claim 7, wherein in said acquiring, when said handover data is not acquired from a memory device in said first processing unit, said handover data is requested to said handover data management computer.

9. A non-transitory computer-readable storage medium storing a program for causing a computer to execute a process, said process comprising:

receiving, from a load distribution apparatus, a processing request from a client terminal after a connection between said client terminal and said load distribution apparatus is disconnected when a fault occurs in one of a plurality of processing units to which a previous processing request from said client terminal was assigned;

acquiring, by using user identification information including a user identifier included in said processing request, handover data that includes handover data identification information, wherein said handover data identification information includes user identification information including a user identifier received from said client terminal when a client of said client terminal logged-in, and said handover data is used to continuously carry out a processing carried out by said one of said plurality of processing units;

carrying out said processing of said processing request by using the acquired handover data to generate handover data;

transmitting the generated handover data to a handover management computer that stores and manages said handover data; and generating and transmitting response data for said client terminal.

10. The non-transitory computer-readable storage medium as set forth in claim 9, wherein said carrying out said processing of said processing request comprises storing the generated handover data in a memory device in said computer, and said acquiring further comprises requesting said handover data for said handover data management computer, when said handover data is not stored in said memory device in said computer.

11. A computer, comprising:

a unit to receive, from a load distribution apparatus, a processing request from a client terminal;

a first unit to acquire, by using user identification information including a user identifier included in said processing request, when a connection between said client terminal and said load distribution apparatus is disconnected when a fault occurs in one of a plurality of processing units to which a previous processing request was assigned, handover data that includes handover data identification information, wherein said handover data identification information includes user identification information including a user identifier received from said client terminal when a client of said client terminal logged-in, and said handover data is used to continuously carry out a processing carried out by said one of said plurality of processing units;

a second unit to carry out said processing by using the acquired handover data to generate handover data;

a unit to transmit the generated handover data to a handover management computer that stores and manages said handover data; and a unit to generate and transmit response data for said client terminal.

12. The computer as set forth in claim 11, further comprising a memory device, and wherein said second unit stores the generated handover data in said memory device, and when said processing request is assigned to said computer by said load distribution apparatus, said first unit acquires handover data including the same user identification information as the user identification information included in the processing request from said memory device or from said handover data management computer if said memory device does not store said handover data.

\* \* \* \* \*